(12) United States Patent
Hasegawa et al.

(10) Patent No.: US 11,302,349 B2
(45) Date of Patent: Apr. 12, 2022

(54) MAGNETIC RECORDING MEDIUM AND MAGNETIC STORAGE APPARATUS

(71) Applicant: SHOWA DENKO K.K., Tokyo (JP)

(72) Inventors: Kota Hasegawa, Chiba (JP); Takayuki Fukushima, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 17/325,347

(22) Filed: May 20, 2021

(65) Prior Publication Data
US 2021/0366510 A1 Nov. 25, 2021

(30) Foreign Application Priority Data
May 21, 2020 (JP) .............................. JP2020-089185

(51) Int. Cl.
*G11B 5/65* (2006.01)
*G11B 5/02* (2006.01)
*G11B 5/73* (2006.01)

(52) U.S. Cl.
CPC ............ *G11B 5/02* (2013.01); *G11B 5/73917* (2019.05)

(58) Field of Classification Search
CPC ..... G11B 20/16; G11B 20/12; G11B 5/59633; G11B 20/1205; G11B 20/1209; G11B 5/653; G11B 5/6083; G11B 5/6088; G11B 5/66; G11B 2005/0024; G11B 2005/0029
USPC .......................................................... 360/48
See application file for complete search history.

(56) References Cited

U.S. PATENT DOCUMENTS 9,689,065 B2 6/2017 Chen et al.
9,940,961 B2 * 4/2018 Ono ........................ G11B 5/65

FOREIGN PATENT DOCUMENTS

JP   2015-130223   7/2015
JP   2016-026368   2/2016
JP   2017-182861   10/2017

OTHER PUBLICATIONS

K. F. Dong et al., "L10 FePt—ZrO2 (001) nanostructured films with high aspect ratio columnar grains", Appl. Phys. Lett. 104, 192404 (2014).

* cited by examiner

*Primary Examiner* — Nabil Z Hindi
(74) *Attorney, Agent, or Firm* — IPUSA, PLLC

(57) ABSTRACT

A magnetic recording medium includes a substrate, an underlayer disposed above the substrate, and a first magnetic layer disposed above the underlayer. The first magnetic layer has a granular structure including magnetic grains having a $L1_0$ structure, and grain boundaries. A content of the grain boundaries is in a range of 25 volume percent to 50 volume percent, and the grain boundaries include a chalcogenide-based layered material.

8 Claims, 2 Drawing Sheets

MAGNETIC RECORDING MEDIUM AND MAGNETIC STORAGE APPARATUS

CROSS-REFERENCE TO RELATED APPLICATIONS

This application is based upon and claims priority to Japanese Patent Application No. 2020-089185 filed on May 21, 2020, the entire contents of which are incorporated herein by reference.

BACKGROUND OF THE INVENTION

1. Field of the Invention

The present invention relates to magnetic recording media, and magnetic storage apparatuses.

2. Description of the Related Art

A thermally assisted (or heat assisted) magnetic recording method, which reduces the coercivity of the magnetic recording medium and records magnetic information by locally heating the surface of the magnetic recording medium by irradiating near-field light or the like on the magnetic recording medium, is regarded as a promising next generation recording method that can realize a surface recording density on the order of approximately 2 Tbit/inch$^2$. When the thermally assisted magnetic recording method is employed, the magnetic information can easily be recorded on the magnetic recording medium having a coercivity of several tens of kOe at room temperature, by the recording magnetic field of a magnetic head. For this reason, magnetic grains having a high crystalline magnetic anisotropy constant (or Ku value), that is, a high-Ku magnetic grains, can be used for the magnetic layer. As a result, the size of magnetic grains forming the magnetic layer can be reduced, while maintaining the thermal stability.

Known high-Ku magnetic grains include magnetic grains having a L1$_0$ structure, such as Fe—Pt alloy grains (Ku~7×10$^6$ J/m$^3$), Co—Pt alloy grains (Ku~5×10$^6$ J/m$^3$), or the like.

On the other hand, various nonmagnetic materials, which may be used as the material forming grain boundaries included in the magnetic layer having a granular structure, are known from Japanese Laid-Open Patent Publications No. 2016-026368, No. 2017-182861, and No. 2015-130223, and K. F. Dong et al., "L1$_0$ FePt—ZrO$_2$ (001) nanostructured films with high aspect ratio columnar grains", Appl. Phys. Lett. 104, 192404 (2014), for example.

However, there are demands to further improve the surface recording density of the magnetic recording media.

SUMMARY OF THE INVENTION

Accordingly, one object according to one aspect of the embodiments of the present invention is to provide a magnetic recording medium having a high coercivity, a magnetic layer including magnetic grains having a small grain diameter, and a high anisotropy.

According to one aspect of the embodiments of the present invention, a magnetic recording medium includes a substrate; an underlayer disposed above the substrate; and a first magnetic layer disposed above the underlayer, wherein the first magnetic layer has a granular structure including magnetic grains having a L1$_0$ structure, and grain boundaries, wherein a content of the grain boundaries is in a range of 25 volume percent to 50 volume percent, and wherein the grain boundaries include a chalcogenide-based layered material.

According to another aspect of the embodiments of the present invention, a magnetic storage apparatus includes the magnetic recording medium described above; and a magnetic head configured to write information to and read information from the magnetic recording medium.

Other objects and further features of the present invention will be apparent from the following detailed description when read in conjunction with the accompanying drawings.

DESCRIPTION OF THE PREFERRED EMBODIMENTS

Figure 1:
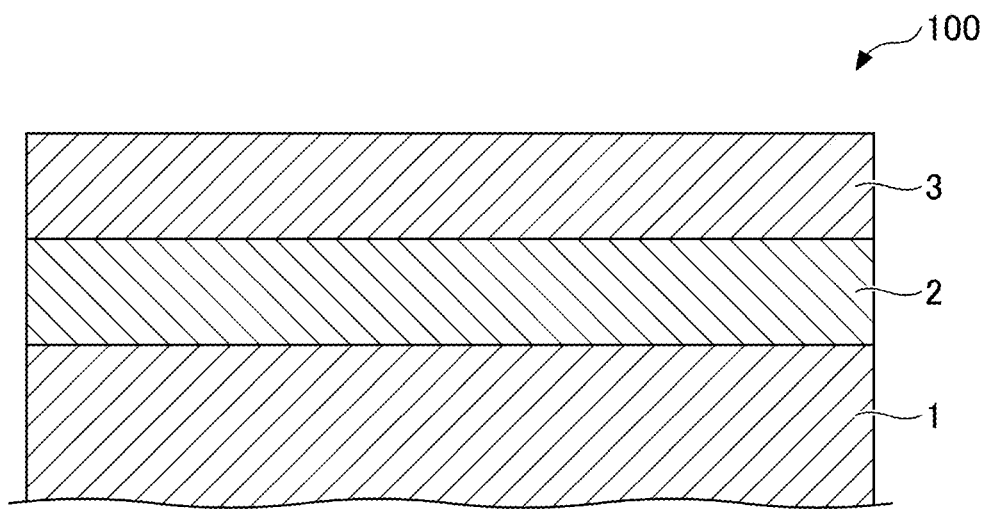
FIG. 1 is a cross sectional view illustrating an example of a layer structure of a magnetic recording medium according to one embodiment of the present embodiment.

Embodiments of the present invention will be described in detail with reference to the drawings. For the sake of convenience, some parts may be illustrated on an enlarged scale in the drawings to facilitate understanding thereof. Hence, dimensional ratios of the various parts in the drawings may differ from the actual dimensional ratios of the various parts. In addition, the materials, the dimensions, or the like illustrated and described in the following are merely examples.

[Magnetic Recording Medium]

FIG. 1 illustrates an example of the layer structure of a magnetic recording medium according to one embodiment.

A magnetic recording medium 100 illustrated in FIG. 1 includes a substrate 1, an underlayer 2, and a magnetic layer 3, which are laminated in this order.

The magnetic layer 3 has a granular structure including magnetic grains having a L1$_0$ structure, and grain boundaries. The grain boundaries include a chalcogenide-based layered material.

The chalcogenide-based layered material is a material having a layered structure in which a unit layer formed by a strong bond (for example, covalent bond or ionic bond) with chalcogens (oxygen family elements or elements in group 16) is laminated via a weak bond (for example, Van der Waals force).

Examples of chalcogenide-based layered materials include TiS$_2$, ZrS$_2$, HfS$_2$, VS$_2$, NbS$_2$, TaS$_2$, MOS$_2$, WS$_2$, TiSe$_2$, ZrSe$_2$, HfSe$_2$, VSe$_2$, NbSe$_2$, TaSe$_2$, MoSe$_2$, WSe$_2$, TiTe$_2$, ZrTe$_2$, HfTe$_2$, VTe$_2$, NbTe$_2$, TaTe$_2$, MoTe$_2$, WTe$_2$, GaS, GaSe, GaTe, InSe, GeS, SnS$_2$, SnSe$_2$, PbO, Bi$_2$Se$_3$, Bi$_2$Te$_3$, or the like. Among such examples of the chalfogenide-based layered materials, TiS$_2$, ZrS$_2$, HfS$_2$, VS$_2$, NbS$_2$, TaS$_2$, MOS$_2$, WS$_2$, GaS, GeS, and SnS$_2$ are preferable because the atomic weight of the anion is small and the mobility is relatively high.

Because the chalcogenide-based layered material is a hexagonal crystal with parallel overlapping planes (001), a layered structure is easily formed. Hence, when growing the magnetic layer 3, grain boundaries can be formed between the magnetic grains having a small grain diameter (or grain size). In addition, the chalcogenide-based layered material does not interfere with the ordering of the magnetic grains, because the chalcogenide-based layered material has a low reactivity with the magnetic grains having the $L1_0$ structure. Further, by setting the content of the grain boundaries within the magnetic layer 3 to fall within a range of 25 volume percent to 50 volume percent, the grain diameter of the magnetic grains can be reduced, and a packing density of the magnetic grains in a growth plane can be increased. As a result, an anisotropy of the magnetic grains can be increased, and a coercivity of the magnetic recording medium 100 can be increased.

Examples of magnetic grains having the $L1_0$ structure include Fe—Pt alloy grains, Co—Pt alloy grains, or the like, for example.

The content of the grain boundaries in the magnetic layer 3 may be in the range of 25 volume percent to 50 volume percent, and more preferably in a range of 35 volume percent to 45 volume percent. If the content of the grain boundaries in the magnetic layer 3 is less than 25 volume percent, or exceeds 50 volume percent, the coercivity of the magnetic recording medium 100 and the anisotropy of the magnetic grains included in the magnetic layer 3 decrease.

The magnetic grains included in the magnetic layer 3 are preferably c-axis oriented with respect to the substrate 1, that is, (001) plane oriented.

Examples of the method of causing the c-axis orientation of the magnetic grains included in the magnetic layer 3 with respect to the substrate 1, include a method of epitaxially growing the magnetic layer 3 in the c-axis direction using the underlayer 2, or the like.

The grain boundaries may further include a component other than the chalcogenide-based layered material, such as carbide, nitride, oxide, boride, or the like.

Other examples of the component other than the chalcogenide-based layered material include BN, $B_4C$, C, MoOs, $GeO_2$, or the like, for example.

The magnetic recording medium 100 may further include a magnetic layer (not illustrated) other than the magnetic layer 3. More particularly, the magnetic recording medium 100 preferably further includes a magnetic layer including boron (B), between the underlayer 2 and the magnetic layer 3. In this case, when the grain diameter of the magnetic grains included in the magnetic layer including the boron is reduced, the grain diameter of the magnetic grains included in the magnetic layer 3 and having the $L1_0$ structure can be reduced.

The material forming the underlayer 2 is not particularly limited as long as the material can cause the (001) plane orientation of the magnetic grains included in the magnetic layer 3 and having the $L1_0$ structure.

The underlayer 2 may have a multi-layer structure including a plurality of laminated layers.

The underlayer 2 preferably includes a NaCl-type compound.

Examples of the NaCl-type compound include MgO, TiO, NiO, TiN, TaN, HfN, NbN, ZrC, HfC, TaC, NbC, TiC, or the like, and it is possible to use a combination of two or more such compounds as the NaCl-type compound.

When manufacturing the magnetic recording medium 100, the substrate 1 may be heated to a temperature of 500° C. or higher. For this reason, the substrate 1 is preferably a heat-resistant glass substrate having a softening temperature of 500° C. or higher, and preferably 600° C. or higher, for example.

The magnetic recording medium 100 preferably further includes a protection layer (not illustrated) formed on the magnetic layer 3.

Examples of the protection layer include hard carbon films, or the like, for example.

Examples of the method of depositing the protection layer include Radio Frequency-Chemical Vapor Deposition (RF-CVD), Ion Beam Deposition (IBD), Filtered Cathodic Vacuum Arc (FCVA), or the like, for example. The RF-CVD decomposes a source gas made of hydrocarbon by high-frequency plasma to deposit the protection layer. The IBD ionizes the source gas by electrons emitted from a filament to deposit the protection layer. The FCVA deposits the protection layer using a solid carbon target, without using a source gas.

The protection layer preferably has a thickness in a range of 1 nm to 6 nm, for example. A satisfactory floating characteristic of the magnetic head is obtained if the thickness of the protection layer is 1 nm or greater, and a magnetic spacing becomes small and a Signal-to-Noise Ratio (SNR) of the magnetic recording medium 100 improves if the thickness of the protection layer is 6 nm or less.

The magnetic recording medium 100 may further include a lubricant layer (not illustrated) formed on the protection layer.

Examples of a lubricant forming the lubricant layer include fluororesins, such as perfluoropolyether, or the like, for example.

[Magnetic Storage Apparatus]

A magnetic storage apparatus according to one embodiment is not particularly limited as long as the magnetic storage apparatus includes one or a plurality of magnetic recording media according to the embodiment described above.

For example, the magnetic storage apparatus according to this embodiment includes a driving mechanism that drives the magnetic recording medium to rotate in a recording direction, and a thermally assisted magnetic head having a near-field light generator (or near-field light generating element) provided on a tip end thereof. The magnetic storage apparatus further includes a head moving mechanism that moves the thermally assisted magnetic head, and a signal processor that processes signals that are input to the thermally assisted magnetic head to be recorded on the magnetic recording medium, and processes signals that are reproduced from the magnetic recording medium by the thermally assisted magnetic head and output from the thermally assisted magnetic head.

The thermally assisted magnetic head further has a laser generator that generates laser light for heating the magnetic recording medium, and a waveguide that guides the laser light generated from the laser generator to the near-field light generator.

Figure 2:
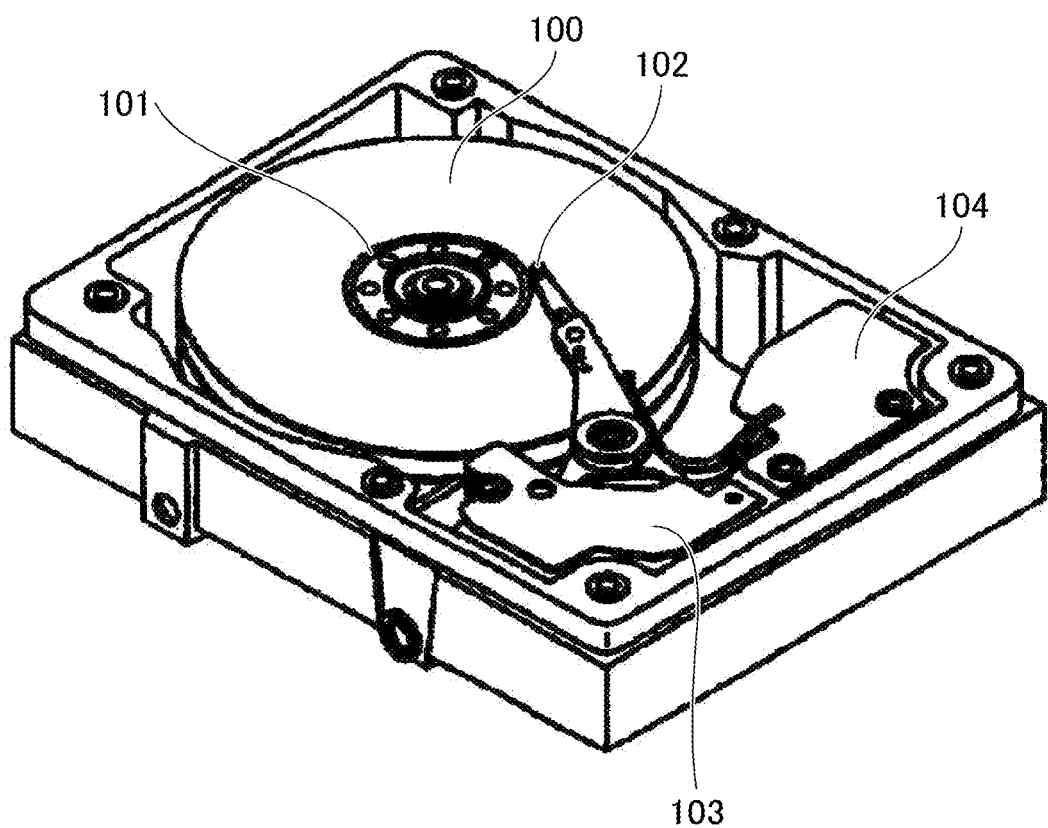
FIG. 2 is a perspective view illustrating an example of a magnetic storage apparatus according to one embodiment of the present invention.

FIG. 2 illustrates an example of the magnetic storage apparatus according to this embodiment.

The magnetic storage apparatus illustrated in FIG. 2 includes one or a plurality of magnetic recording media 100, a driving mechanism 101 that drives the magnetic recording medium 100 to rotate, a thermally assisted magnetic head 102, a head moving mechanism 103 that moves the thermally assisted magnetic head 102, and a signal processor 104. The signal processor 104 processes signals that are input to the thermally assisted magnetic head 102 to be recorded on the magnetic recording medium 100, and processes signals that are reproduced from the magnetic recording medium 100 by the thermally assisted magnetic head 102 and output from the thermally assisted magnetic head 102. For example, the magnetic recording medium 100 may have a disk shape, and in this case, the magnetic storage apparatus may form a Hard Disk Drive (HDD).

Figure 3:
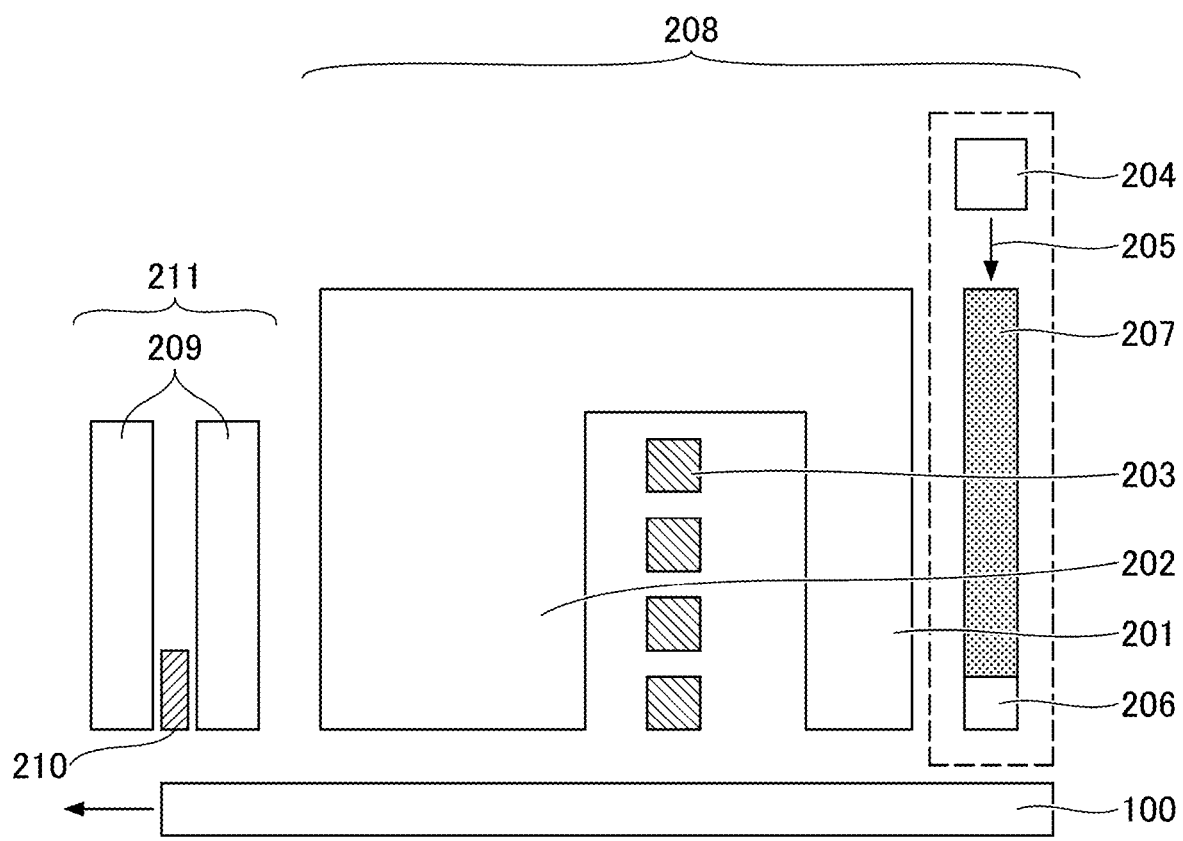
FIG. 3 is a diagram schematically illustrating an example of a thermally assisted magnetic head of the magnetic storage apparatus illustrated in FIG. 2.

An example of the thermally assisted magnetic head 102 is illustrated in FIG. 3.

The thermally assisted magnetic head 102 includes a recording (or write) head 208 that records (or writes) signals to a corresponding one of the plurality of magnetic recording media 100, and a reproducing (or read) head 211 that reproduces (or reads) signals from the corresponding one of the plurality of magnetic recording media 100.

The recording head 208 includes a main magnetic pole 201, an auxiliary magnetic pole 202, a coil 203 that generates a magnetic field, a laser diode (LD) 204, which is an example of the laser generator and generates laser light 205, a near-field light generator (or near-field light generating element) 206 that generates near-field light for heating the magnetic recording medium 100, and a waveguide 207. The waveguide 207 guides the laser light 205 generated from the laser diode 204 to the near-field light generator 206 that is provided on a tip end of the magnetic head 102.

The reproducing head 211 includes a reproducing element 210, such as a TMR (Tunneling Magneto-Resistive) element or the like, for example, that is sandwiched between a pair of shields 209.

Of course, a microwave assisted magnetic head, which employs a microwave assisted magnetic recording method, may be used in place of the thermally assisted magnetic recording head, which employs the thermally assisted magnetic recording method.

Next, exemplary implementations according to the present invention will be described. The present invention is not limited to these exemplary implementations, and various variations and modifications may be made without departing from the scope of the present invention. In the following, "at %" represents atomic percent, and "vol %" represents volume percent.

[Exemplary Implementation Emb1]

A magnetic recording medium according to an exemplary implementation Emb1 was manufactured as follows. That is, a Cr-50at % Ti alloy layer having a thickness of 100 nm, and a Co-27at % Fe-5at % Zr-5at % B alloy layer having a thickness of 30 nm, were successively formed on a glass substrate, as an underlayer. Then, after heating the glass substrate to a temperature of 250° C., a Cr layer having a thickness of 10 nm, and a MgO layer having a thickness of 5 nm were successively formed on the underlayer. Next, after heating the glass substrate to a temperature of 450° C., a (Fe-48at % Pt-5at % B)-40 vol % C alloy layer having a thickness of 2 nm, and a (Fe-49at % Pt)-40 vol % $MoS_2$ alloy layer having a thickness of 13 nm were successively formed, as a first magnetic layer and a second magnetic layer, respectively. Further, a carbon film having a thickness of 3 nm was formed as a protection layer, thereby completing manufacture of the magnetic recording medium.

[Exemplary Implementations Emb2 Through Emb16, and Comparative Examples Cmp1 and Cmp2]

The magnetic recording media according to exemplary implementations Emb2 through Emb16, and comparative examples Cmp1 and Cmp2, were manufactured in the same manner as the exemplary implementation Emb1 described above, except for the material forming the second magnetic layer which was modified as illustrated in Table 1 below.

TABLE 1

| | Second Magnetic Layer | Coercivity [kOe] | Magnetic Grain | |
|---|---|---|---|---|
| | | | Grain Diameter [nm] | Height [nm] |
| Emb1 | (Fe-49at % Pt)-40 vol % $MoS_2$ | 25 | 6.5 | 15 |
| Emb2 | (Fe-49at % Pt)-40 vol % $MoS_2$ | 24 | 6.0 | 15 |
| Emb3 | (Fe-49at % Pt)-30 vol % $MoS_2$-10 vol % BN | 26 | 6.5 | 15 |
| Emb4 | (Fe-49at % Pt)-20 vol % $MoS_2$-20 vol % BN | 27 | 6.5 | 15 |
| Emb5 | (Fe-49at % Pt)-10 vol % $MoS_2$-30 vol % BN | 28 | 6.5 | 15 |
| Emb6 | (Fe-49at % Pt)-20 vol % $MoS_2$-20 vol % BN | 27 | 6.5 | 15 |
| Emb7 | (Fe-49at % Pt)-30 vol % $TiS_2$-10 vol % BN | 29 | 6.5 | 15 |
| Emb8 | (Fe-49at % Pt)-30 vol % $ZrS_2$-10 vol % BN | 24 | 6.5 | 15 |
| Emb9 | (Fe-49at % Pt)-30 vol % $HfS_2$-10 vol % BN | 25 | 6.5 | 15 |
| Emb10 | (Fe-49at % Pt)-30 vol % $VS_2$-10 vol % BN | 28 | 6.5 | 15 |
| Emb11 | (Fe-49at % Pt)-30 vol % $NbS_2$-10 vol % BN | 24 | 6.5 | 15 |
| Emb12 | (Fe-49at % Pt)-30 vol % $TaS_2$-10 vol % BN | 24 | 6.5 | 15 |
| Emb13 | (Fe-49at % Pt)-30 vol % $WS_2$-10 vol % BN | 24 | 6.5 | 15 |
| Emb14 | (Fe-49at % Pt)-30 vol % $GaS_2$-10 vol % BN | 28 | 6.5 | 15 |
| Emb15 | (Fe-49at % Pt)-30 vol % $GeS_2$-10 vol % BN | 29 | 6.5 | 15 |
| Emb16 | (Fe-49at % Pt)-30 vol % $SnS_2$-10 vol % BN | 29 | 6.5 | 15 |
| Cmp1 | (Fe-49at % Pt)-30 vol % $SiO_2$-10 vol % BN | 20 | 7.5 | 7 |
| Cmp2 | (Fe-49at % Pt)-40 vol % BN | 23 | 7.5 | 6 |

Next, the coercivities of the magnetic recording media, the grain diameter (or grain size) and height of the magnetic grains included in the second magnetic layer of each of the magnetic recording media were evaluated.

[Coercivity]

A Kerr magnetometer, manufactured by Neoark Corporation, was used to measure the coercivities of the magnetic recording media.

[Grain Diameter and Height of Magnetic Grains Included in Second Magnetic Layer]

The grain diameter and height of the magnetic grains included in the second magnetic layer were determined using a transmission electron microscope, manufactured by Hitachi High-Tech Corporation. In this case, the height of the magnetic grains included in the second magnetic layer, is defined as the height of the magnetic grains of the second magnetic layer, epitaxially grown on the magnetic grains forming the first magnetic layer, when the magnetic grains of the second magnetic layer can no longer grow epitaxially (that is, no further epitaxial growth is possible) and before generation of secondary grains start, and the magnetic grains of the first magnetic layer are included in the height of the magnetic grains included in the second magnetic layer.

Table 1 illustrates the evaluation results of the coercivity of the magnetic recording medium, and the grain diameter and height of the magnetic grains included in the second magnetic layer, for each of the exemplary implementations Emb1 through Emb16, and the comparative examples Cmp1 and Cmp2.

From Table 1, it was confirmed that the magnetic recording media according to the exemplary implementations Emb1 through Emb16 have a high coercivity, a small grain diameter of the magnetic grains included in the second magnetic layer, and a high anisotropy.

On the other hand, in the magnetic recording media according to the comparative examples Cmp1 and Cmp2, because the grain boundaries of the second magnetic layer do not include the chalcogenide-based layered material, the coercivity is low, and the grain diameter of the magnetic grains included in the second magnetic layer is large, and the anisotropy is low.

According to the embodiments and the exemplary implementations described above, it is possible to provide a magnetic recording medium having a high coercivity, a magnetic layer including magnetic grains having a small grain diameter, and a high anisotropy, as confirmed by the evaluation results described above.

Further, the present invention is not limited to these embodiments and exemplary implementations, but various variations, modifications, and substitutions may be made without departing from the scope of the present invention.

What is claimed is:

1. A magnetic recording medium comprising:
   a substrate;
   an underlayer disposed above the substrate; and
   a first magnetic layer disposed above the underlayer,
   wherein the first magnetic layer has a granular structure including magnetic grains having a $L1_0$ structure, and grain boundaries,
   wherein a content of the grain boundaries is in a range of 25 volume percent to 50 volume percent, and
   wherein the grain boundaries include a chalcogenide-based layered material.

2. The magnetic recording medium as claimed in claim 1, wherein the chalcogenide-based layered material is selected from a group consisting of $TiS_2$, $ZrS_2$, $HfS_2$, $VS_2$, $NbS_2$, $TaS_2$, $MoS_2$, $WS_2$, $GaS$, $GeS$, and $SnS_2$.

3. The magnetic recording medium as claimed in claim 2, further comprising:
   a second magnetic layer including boron, disposed between the underlayer and the first magnetic layer.

4. The magnetic recording medium as claimed in claim 1, further comprising:
   a second magnetic layer including boron, disposed between the underlayer and the first magnetic layer.

5. A magnetic storage apparatus comprising:
   the magnetic recording medium according to claim 1; and
   a magnetic head configured to write information to and read information from the magnetic recording medium.

6. A magnetic storage apparatus comprising:
   the magnetic recording medium according to claim 2; and
   a magnetic head configured to write information to and read information from the magnetic recording medium.

7. A magnetic storage apparatus comprising:
   the magnetic recording medium according to claim 3; and
   a magnetic head configured to write information to and read information from the magnetic recording medium.

8. A magnetic storage apparatus comprising:
   the magnetic recording medium according to claim 4; and
   a magnetic head configured to write information to and read information from the magnetic recording medium.

* * * * *